United States Patent
Aebi

(10) Patent No.: US 8,498,613 B2
(45) Date of Patent: *Jul. 30, 2013

(54) METHOD AND SYSTEM FOR LOCATION-DEPENDENT BILLING FOR SERVICES

(75) Inventor: Paul Aebi, Munchringen (CH)

(73) Assignee: Swisscom AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,901

(22) Filed: Jul. 3, 2012

(65) Prior Publication Data

US 2012/0289190 A1    Nov. 15, 2012

Related U.S. Application Data

(63) Continuation of application No. 13/152,967, filed on Jun. 3, 2011, now Pat. No. 8,238,874, which is a continuation of application No. 11/671,938, filed on Feb. 6, 2007, now Pat. No. 8,014,754.

(30) Foreign Application Priority Data

Feb. 6, 2006    (EP) ..................................... 06101335

(51) Int. Cl.
*H04M 11/00*    (2006.01)

(52) U.S. Cl.
USPC ...... 455/406; 455/456.1; 455/41.1; 455/41.2; 455/407; 379/114.28

(58) Field of Classification Search
USPC .................. 455/456.2, 405–409, 456.1, 41.2; 379/114.28
See application file for complete search history.

(56) References Cited

U.S. PATENT DOCUMENTS

| 3,974,363 | A | * | 8/1976 | Malinich | 377/8 |
| 4,273,962 | A | * | 6/1981 | Wolfe | 379/115.01 |
| 4,688,026 | A | * | 8/1987 | Scribner et al. | 235/385 |
| 5,561,706 | A |   | 10/1996 | Fenner | |
| 5,774,802 | A |   | 6/1998 | Tell et al. | |
| 6,157,825 | A |   | 12/2000 | Frederick | |
| 6,201,957 | B1 | * | 3/2001 | Son et al. | 455/406 |
| 6,516,190 | B1 | * | 2/2003 | Linkola | 455/408 |
| 6,574,464 | B1 | * | 6/2003 | Chen | 455/406 |

(Continued)

FOREIGN PATENT DOCUMENTS

| DE | 198 19 582 | 11/1999 |
| WO | WO 9858509 | 12/1998 |
| WO | WO 2004054304 | 6/2004 |

*Primary Examiner* — Kamran Afshar
*Assistant Examiner* — Mong-Thuy Tran
(74) *Attorney, Agent, or Firm* — McAndrews, Held & Malloy, Ltd.

(57) ABSTRACT

A method and system for location-dependent billing for services that are available to mobile terminals. A mobile terminal may access a fixably installed external location tag, and may obtain from the external location tag a billing rate code, which may then be forwarded from the mobile terminal to a central unit of a mobile communication network, in which the mobile terminal is logged. The central unit may determine a geographic location identification of the external location tag—e.g., by evaluation of the billing rate code—and may select a billing rate for billing for service(s) available to the user, based on the billing rate code at the external location tag. The mobile terminal may access the external location tag via a local communication connection, which may be set up between the mobile terminal and external location tag, such as using a corresponding wireless interface therebetween.

18 Claims, 1 Drawing Sheet

U.S. PATENT DOCUMENTS

| | | |
|---|---|---|
| 6,618,807 B1 | 9/2003 | Wang et al. |
| 6,907,252 B2 | 6/2005 | Papadias et al. |
| 6,975,229 B2 | 12/2005 | Carrender |
| 7,053,793 B2 | 5/2006 | Tajima et al. |
| 7,107,247 B2 | 9/2006 | Kinoshita et al. |
| 7,295,114 B1 | 11/2007 | Drzaic et al. |
| 7,397,424 B2 | 7/2008 | Houri |
| 7,510,110 B2 | 3/2009 | Pietrzyk et al. |
| 7,542,942 B2 | 6/2009 | Peart et al. |
| 7,598,870 B2 | 10/2009 | Borean et al. |
| 7,668,765 B2 | 2/2010 | Tanaka et al. |
| 2002/0068544 A1 | 6/2002 | Barzilay et al. |
| 2002/0123934 A1 | 9/2002 | Tanaka et al. |
| 2003/0045269 A1 | 3/2003 | Himmel et al. |
| 2003/0054836 A1 | 3/2003 | Michot |
| 2003/0114141 A1* | 6/2003 | Offer ............................. 455/406 |
| 2004/0002305 A1 | 1/2004 | Byman-Kivivuori et al. |
| 2004/0033795 A1 | 2/2004 | Walsh et al. |
| 2004/0045021 A1* | 3/2004 | Weinblatt et al. ................ 725/20 |
| 2004/0053599 A1* | 3/2004 | Karaoguz et al. ............. 455/408 |
| 2005/0009499 A1 | 1/2005 | Koster |
| 2005/0101292 A1* | 5/2005 | Fukui ............................ 455/406 |
| 2005/0145688 A1 | 7/2005 | Milenkovic et al. |
| 2005/0175181 A1 | 8/2005 | Bergs et al. |
| 2005/0245271 A1 | 11/2005 | Vesuna |
| 2006/0015503 A1 | 1/2006 | Simons et al. |
| 2007/0032261 A1* | 2/2007 | Boyer et al. ................ 455/550.1 |
| 2007/0060174 A1 | 3/2007 | Newton et al. |
| 2008/0119160 A1* | 5/2008 | Andriantsiferana et al. . 455/406 |

* cited by examiner

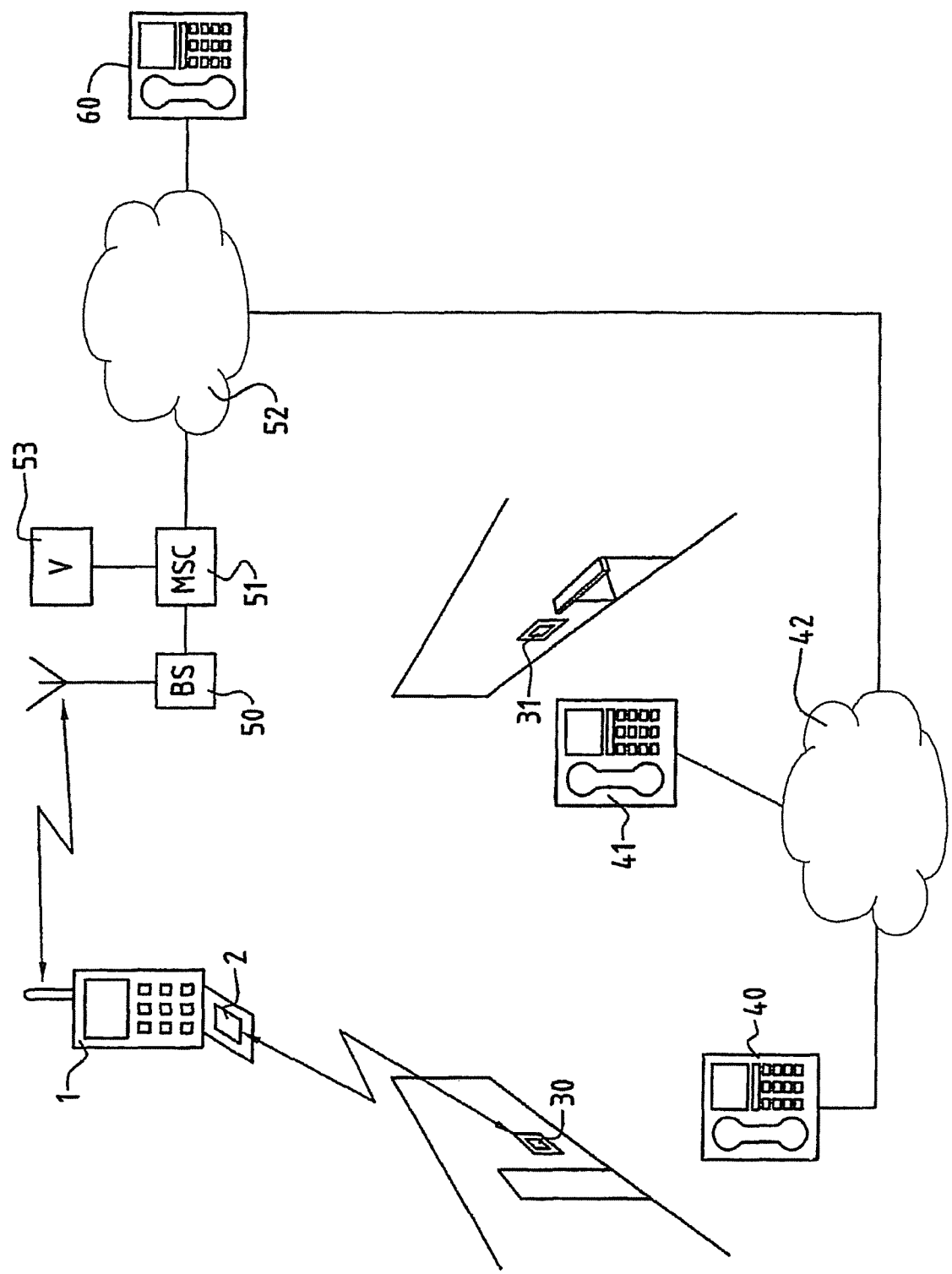

METHOD AND SYSTEM FOR LOCATION-DEPENDENT BILLING FOR SERVICES

CROSS REFERENCE TO RELATED APPLICATIONS

This application is a continuation of U.S. patent application Ser. No. 13/152,967, which was filed on Jun. 3, 2011, and which in turn was a continuation of U.S. patent application Ser. No. 11/671,938, filed on Feb. 6, 2007, and which claimed the benefit of priority under 35 U.S.C. §119 to prior European Application No. 06101335.5, filed on Feb. 6, 2006. Each of above stated applications is hereby incorporated herein by reference in its entirety.

FIELD OF THE INVENTION

The present invention relates to a method and a system for location-dependent billing of services. The invention relates in particular to the location-dependent billing for a service availed of by a user by means of a mobile terminal including an identification module.

BACKGROUND DISCUSSION RELATED TO THE INVENTION

There are many different methods in the state of the art for the billing of calls, i.e. for debiting a monetary amount for a call of the customer carried out. Calls may be billed based on duration and destination number, for instance. Thus calls to foreign countries during business hours may be billed at a higher fee than calls within a city network outside of business hours, for example. Such billing models may be supported by offer concept and demand for services. The billing of calls may also be based on a flat-rate fee, so that a call is always billed at the same price. A flat-rate fee can bring savings during operation of the technical installations necessary for the billing. Implementation of a location-dependent billing of calls for mobile telephones is also known in the state of the art, in particular during a change of location between different network operators (roaming). Network operators of mobile radio networks would also like to apply fee structures by means of which fixed network telephony may be competed with directly, for example. To this end, the network operator of a mobile radio network would use an appropriate fee for the billing corresponding to the current location of the mobile telephone. The current location may thereby relate to the place of residence of the user, to the means of transportation of the user, such as a train, or to the location in an office building. For the location at the place of residence of the user, the network operator of the mobile radio network would apply a fee structure for private telephone connections that competes with the fee structure of the network operator of a fixed telephone network. Correspondingly, the network operator of the mobile radio network would apply a fee for the billing of calls for a mobile location such as, for example, in a train or on the street, or for a location in an office building by means of which the respective network operator would be able to compete directly at these locations.

Described in the international application WO 99/05875 from the Assignee Siemens AG is a method for the billing of calls. Zones are defined for a subscriber through a combination of radio cells and/or areas of location. Such zones can relate to a home zone, a city zone or an office zone. A zone tariff is assigned to a zone, and a billing device is informed about the zones defined for the subscriber, which are used for determining the call fee when the subscriber is located in one of the zones.

Described in European patent application EP 0 939 570 from the Assignee Siemens AG is a method for location-dependent billing of connections between mobile subscribers. With a connection of a mobile subscriber, location information is determined for the radio technical installation in connection with the mobile subscriber, and a home local area rate is billed if the location information pertains to a home range for the subscriber.

A drawback of this method is that such ranges or such local information may be determined with too little precision for many applications, or the current location of a user may be established in an insufficiently exact way. Also a disadvantage of this method is that the technical implementation is too costly.

Described in the U.S. Patent Application with the Publication Number US 2003/0054836 is a method of time recording of a person in motion. By means of a reading device, data is read by a transponder, and is transmitted to a mobile telephone. By means of the mobile telephone, the data is transmitted to a control center, time information being stored in the control center.

Described in the international application WO 98/58509 is a chipcard for GSM cellular telephones. The chipcard comprises storage means for storing identification data for a subscriber as well as electrical contacts for connection of the chipcard to a mobile communication station. The chipcard contains at least one coil that enables the setting up of communication between the chipcard and a communication station located outside the external device.

Described in the international application WO 2004/054304 is a method for anonymous tracking of the position of a portable device in a wireless infrastructure. By means of the wireless stations, a unique identifier of a device is registered, for instance via the ZigBee protocol. The identifier is stored in a database via a backbone of the wireless infrastructure together with a piece of time information, so that the last interaction of the device with a station may be checked.

BRIEF SUMMARY OF THE INVENTION

It is an object of the present invention to propose a new method and a new system for location-dependent billing of a service availed of by a user with a mobile terminal comprising an identification module, which method and which system do not have the drawbacks of the state of the art.

These objects are achieved according to the present invention in particular through the elements of the independent claims. Further advantageous embodiments follow moreover from the dependent claims and from the description.

In particular, these objects are achieved by the invention in that a local communication connection to at least one external location tag with a corresponding wireless interface is established via a wireless interface of the identification module of the mobile terminal, a location identification is determined through an evaluation of data of the at least one external location tag, and, in a billing unit for billing of services, a billing rate assigned to the location identification is selected. The billing rate can thereby be determined based on any method, or the billing rate can be selected from a defined quantity. Such a method has the advantage in particular that the billing rate applied may be adapted very precisely to the current location of the mobile terminal. The location identification can thereby relate to a zone, such as, for instance, a private apartment, the compartment in a train, an office in an office building, a restaurant, an advertising poster or a hotspot of a wireless network. The location identification can also relate to geographic coordinates or a geographic distance to services or telecommunications installations of third parties.

In an embodiment variant, the local communication connection is set up via an interface based on the ZigBee standard, based on the Bluetooth standard or based on an NFC standard (NFC: Near Field Communication). Such a local communication connection can be set up such that in particular no mobile radio network is availed of. Such a method has in particular the advantage that tried and tested technologies may be used for establishing local communication connections.

In another embodiment variant, data is transmitted, by means of the identification module, to a central unit of a mobile communication network in which the mobile terminal is logged, the data of the local tag being evaluated by the central unit, and in accordance with this evaluation a billing rate being selected in the billing unit of the mobile communication network. The billing rate may thereby be determined or selected from a definable number of billing rates, for instance from a table with billing rates. Such an embodiment variant has in particular the advantage that data of the location tag can be transmitted to a central unit via means confidential to the operator of the mobile communication network, and may be evaluated by this central unit using means confidential to the operator of the mobile communication network.

In a further embodiment variant, the data of the location tag are decrypted by the central unit by means of an electronic key stored in the central unit. Such a method has in particular the advantage that data can be stored on the location tag in an encrypted way, so that, for example, data of the location tag can be accessed using just one key of the network operator of the mobile communication network, and thus these data are not visible to third parties, nor able to be falsified by third parties.

In another embodiment variant, the communication connection is established to a location tag secured using security means. The security means can relate, for example, to mechanical means for secure installation of the location tag at a definable place in a room, for instance on a personal computer or at an electrical outlet. Such a method has in particular the advantage that it is ensured for the network operators of the mobile communication network that a location tag cannot be removed by unauthorized persons, nor the location of the location tag changed by unauthorized persons.

In an embodiment variant, the location tag is connected to a communication channel. The communication channel can relate, for example, to a communication channel of a fixed telephone network, to a communication channel based on PLC (PLC: Power Line Communications), to a communication channel of a television cable network or to any other communication channel. The location tag can thus be coupled with a communication channel, it being thus possible, for instance, to check via the communication channel, whether the location tag is correctly placed, or it being possible for data to be loaded on the location tag via the communication channel. Such a method has in particular the advantage that it can be ensured that a location tag is not able to be manipulated or removed by unauthorized third parties.

In another embodiment variant, ascertained by the central unit is via which base station the mobile terminal is logged into the mobile communication network, data of the identified base station being compared with data of the location tag. Such a method has in particular the advantage that the operator of the mobile communication network is able to carry out an additional check of the current location of a mobile terminal using existing means, and thus the plausibility of the location established through data of the location tag can be ascertained.

BRIEF DESCRIPTION OF THE DRAWINGS

Embodiment variants of the present invention will be described in the following with reference to examples. The examples of the embodiments are illustrated by the following attached FIGURE:

FIG. 1 shows a block diagram of a method and system according to the invention for location-dependent billing of services availed of by a user having a mobile terminal with an identification module.

DETAILED DESCRIPTION OF THE INVENTION

In FIG. 1, the reference numeral 1 refers to a mobile terminal and the reference numeral 50 to a base station of a mobile communication network. The mobile terminal can be a mobile telephone, a PDA (PDA: Personal Digital Assistant), a portable computer such as a laptop, a play station or any other mobile terminal. The mobile communication network can be configured according to any standard. Thus, for example, the mobile communication network can relate, for instance, to a GSM (GSM: Global System for Mobile Communications) network, a UMTS (UMTS: Universal Mobile Telecommunications System) network, or a WLAN (WLAN: Wireless Local Area Network) network. The mobile terminal 1 refers to a device corresponding to the mobile communication network, i.e. to a mobile terminal, for instance, which is connectable to the mobile communication network according to the GSM standard, according to the UMTS standard or according to the WLAN standard, via an air interface, for example. The mobile terminal 1 comprises an identification module 2. The identification module 2 can be designed as an identification card, known to one skilled in the art, such as an SIM card (SIM: Subscriber Identity Module) or according to any other standard. The identification module 2 can be separated and removed from the mobile terminal 1. The identification module 2 can also be integrated in the mobile terminal 1, however, so that the identification module is connected in a fixed way to the mobile terminal fest, and cannot be removed. By means of data stored on the identification module 2, the mobile terminal is logged into the communication network via the base station 50, telecommunication connections being able to be set up to or from the mobile terminal, for example. Besides the base station 50, an MSC (MSC: Mobile Switching Center) of the mobile communication network has been drawn in FIG. 1. It is clear to one skilled in the art, however, that a mobile communication network comprises many additional devices, such as, for example, an HLR (HLR: Home Location Register), a VLR (VLR: Visiting Location Register) or an AUC (AUC: Authentication Center), or any registers or devices. In FIG. 1, the reference numeral 52 refers to a telecommunication network of a first provider. The telecommunication network 52 can comprise networks of different technologies. Thus the telecommunication network 52 can comprise in particular a mobile communication network and a fixed network. Of course the mobile communication network also comprises a billing unit 53 for billing telecommunication connections of the mobile terminal 1. In FIG. 1, the billing unit 53 is connected to the MSC. It plays no role, how the billing unit 53 is connected to the network devices of the communication network. Thus the billing unit is also connected to a HLR or an AUC of the mobile communication network, or the billing unit 53 can also be disposed outside the mobile communication network. By means of the billing unit 53, telecommunication connections can be billed according to various parameters, such as, for instance, the duration of the telecommunication connection or the origin or respectively destination of the telecommunication connection. For this purpose, the billing unit 53 comprises, for example, means of assigning to a captured parameter of a telecommunication connection a monetary amount based on a billing rate, and of debiting this monetary amount against an account of the subscriber. Parameters of telecommunication connections can be captured by any device, such as, for instance, an MSC (MSC: Mobile Switching Center), and transmitted to the billing unit 53. The billing rate can be stored in tables of the billing unit 53, a monetary amount being assigned to a duration of a telecommunication connection by means of such tables.

Besides telecommunication connections of the mobile terminal 1, further services can be availed of by the user. Thus a user can avail of a SMS service (SMS: Short Message Service), with which SMS service the latest weather reports or stock market reports can be transmitted on the mobile terminal 1 to the user. Or the user can avail of a television service, the television news being transmitted to the user on the mobile terminal 1, for example. Or, using the mobile terminal 1, the user can make purchases via a web portal, such as orders for books or orders for food. Or the user can pay for use of a service using the credit card in a shop. Such services are debited to the user via corresponding billing devices. Thus a billing device can refer to a device for billing SMS messages, for transmitting MMS messages (MMS: Multimedia Message Service), for transmitting television clips or television news, for delivery of books or foods, for billing of an amount on a credit card account or to the billing of any other services.

In FIG. 1, the reference numerals 30, 31 refer to location tags. As shown schematically in FIG. 1, the location tag 30 can be put on the wall, for example, next to the entrance door of an office used for business. The location tag 31 can be put next to the fireplace of a privately used apartment. The location tags 30, 31 can be put anywhere, however. Data can be stored on the location tags 30, 31, which data are transmittable via wireless interfaces of the identification modules 2 as well as wireless interfaces of the location tags 30, 31. The transmission of the data can take place, for instance, based on the ZigBee standard or based on the Bluetooth standard. The data stored on the location tags can comprise a rate code, for example, an encrypted rate code or the geographic coordinates of a location.

In FIG. 1, the reference numerals 40, 41 refer to terminals of a telecommunication network 42 of a second provider. The telecommunication network 42 can be configured according to any technology, thus e.g. based on a standard for mobile telecommunication networks or based on a standard for fixed networks. In FIG. 1, the telecommunication network 42 refers to a fixed network with terminals 40, 41 installed in a fixed way. The terminal 40 can be installed, for example, in the mentioned office used for business purposes. The terminal 41 can be installed in the mentioned privately used apartment, for example. Of course the terminal 40 and the terminal 41 can be connected via separate telecommunication networks of different operators. Connections that are set up using the terminal 40 or the terminal 41, are billed by a billing unit of the telecommunication network according to a billing rate. Thus for a terminal 40, which is installed in an office used for business, a different rate can be applied, for example a more expensive rate, than for a terminal 41, which is installed in a privately used apartment. Of course such different billing rates vis-à-vis the customer can be justified by corresponding differences in the service quality.

As shown in FIG. 1, the telecommunication network 52 and the telecommunication network 42 are connected together, so that telecommunication connections may be established between the mobile terminal 1 and the terminal 60 as well as between the terminals 40, 41 and the terminal 60. Corresponding gateway devices are used for connecting the telecommunication networks 52, 42.

The identification module 2 can now be set up such that it is possible at definable points in time to check whether a local connection to a location tag can be set up via the wireless interface of the identification module 2. Thus, through the identification module 2, a request for transmission of data of a location tag may be transmitted at definable points in time, for example. Such a request can be based, for example, on a ZigBee standard or a Bluetooth standard, and can comprise, for instance, an identification or an encrypted identification. Such an identification or encrypted identification can be evaluated by correspondingly configured location tags. However, such an identification or encrypted identification cannot be sensibly evaluated by other devices despite a corresponding wireless interface. After the identification is evaluated by the location tag, data from the location tag are transmitted to the identification module 2, for instance. Such a transmission can be triggered by the location tag or by the transmission of a further request from the identification module 2 to the location tag. The data transmitted from the location tag to the identification module 2 may comprise a rate code, an encrypted rate code or geographic coordinates, for example.

The mobile terminal 1 is logged into the mobile communication network via the base station 50. Various generally known methods are used for logging in the mobile terminal 1. Following such methods, an authentication is thus carried out. The operator of the mobile communication network can thus in particular assign the mobile terminal to an authorized subscriber. In addition, a secured communication connection can be set up between the identification module 2 and any device of the mobile communication network.

Thus the data of the location tag can be transmitted via a secure connection of the identification module 2 to any device of the mobile telecommunication network, thus to the billing unit 53, for example. As mentioned, the data of the location tag 30 can comprise an encrypted rate code, for example. Stored on the billing unit 53 can be the corresponding electronic key for decryption of the encrypted rate code. After decryption of the encrypted rate code, a billing rate, assigned to the rate code, can be determined on the billing unit, or be selected from a definable number, for example from a table. Of course the billing rate can be selected such that a telephone apparatus of a second operator of a telecommunication network installed in the vicinity of the location tag can be competed with. The billing rate can also be determined according to any algorithm. Thus the data of the location tag can relate to geographic coordinates, a probability according to which a competitor is offering telecommunication services at this location being determined by means of an algorithm, the billing rate being determined according to this probability or being selected for the billing.

According to the invention, services availed of by a user are billed according to a billing rate that is selected based on the current location of the user. Thus a location tag can be installed on an advertising poster, an access address being printed on the advertising poster for the ordering of the product or service being advertised on the advertising poster. Upon ordering the product using the access address, a monetary amount can be debited to the user by means of a billing device, the user profiting from an especially inexpensive billing rate, for instance, because he is situated at the location of the advertising poster. A location tag can also be installed at a bus stop. To make use of the waiting time at the bus stop, the user can request the transmission from a service provider of the latest television news, for instance. Depending upon price policy of the service provider, such a transmission can now take place according to a selectable billing rate, the data stored on the location tag being taken into consideration in selecting the billing rate.

The location tags 30,31 can be secured using security means. Such security means can relate to mechanical means such as a lockable lock. These security means can also relate to electronic means. Thus a location tag can also be configured as USB (USB: Universal Serial Bus) stick, an identification of the computer being checked upon installation of the USB stick, and the described functions of the location tag being enabled only with a successful checking of this identification.

The wireless interface of the identification module 2 can be configured based on different embodiment variants. Thus the identification module 2 can be designed as common SIM card, for instance, all components of the wireless interface being installed on the SIM card, such as encoder, modulator, decoder, antenna, driver, etc., i.e. all components that are necessary in order to operate the wireless interface according to a ZigBee standard, for instance. Depending upon the application, the SIM card and the wireless interface can also be designed such that components of the wireless interface, such as the antenna, for instance, are installed on the housing of the mobile terminal. Of course further embodiment variants are known to one skilled in the art for installing an identification module 2 according to the invention on a mobile terminal, and for installing a wireless interface on the identification module 2.

What is claimed:

1. A method, comprising:
   receiving from a mobile terminal by a central unit of a mobile communication network, a billing rate code, wherein the billing rate code is obtained by the mobile terminal from an external location tag accessed by the mobile terminal via a local communication connection;
   determining by the central unit, a geographic location identification of the external location tag by evaluation of said billing rate code of the external location tag; and
   selecting by the central unit, a billing rate for billing for a service available to the user based on the billing rate code of the external location tag, wherein the service comprises mobile wireless access to the mobile communication network.

2. The method according to claim 1, wherein the local communication connection is set up via a wireless interface.

3. The method according to claim 2, wherein the wireless interface is based on the ZigBee standard, the Bluetooth standard or a Near Field Communication (NFC) standard.

4. The method according to claim 1, comprising selecting the billing rate by the central unit in accordance with a result of the evaluating in a billing unit at the central unit of the mobile communication network.

5. The method according to claim 1, comprising decrypting the billing rate code of the external location tag by the central unit based on an electronic key.

6. The method according to claim 1, wherein the local communication connection between the mobile terminal and the external location tag is secured through security means.

7. The method according to claim 1, wherein the external location tag is connected to a communication channel.

8. The method according to claim 1, comprising:
   determining by the central unit via which base station the mobile terminal is logged into the mobile communication network; and
   comparing data of the determined base station with the billing rate code of the external location tag.

9. A system, comprising:
   a mobile terminal that is configured to:
      access an external location tag via a local communication connection;
      receive a billing rate code form the external location tag;
      forward the billing rate code from the mobile terminal to a central unit of a mobile communication network, in which the mobile terminal is logged; and
      receive from the central unit billing related information for a service available to the user in accordance with a billing rate assigned to the billing rate code, wherein the service comprises mobile wireless access to the mobile communication network.

10. The system according to claim 9, wherein the mobile terminal that is configured to setup the local communication connection via a wireless interface.

11. The system according to claim 10, wherein the wireless interface is implemented according to the ZigBee standard, the Bluetooth standard or a Near Field Communication (NFC) standard.

12. The system according to claim 9, wherein the local communication connection between the mobile terminal and the external location tag is secured.

13. The system according to claim 9, wherein the external location tag comprises security means for securing the external location tag.

14. The system according to claim 9, wherein the external location tag is configured to be connected to a communication channel.

15. A central unit of a mobile communication network, the central unit is configured to:
   receive from a mobile terminal a billing rate code obtained by the mobile terminal from the external location tag via a local communication connection;
   determine a geographic location identification of the external location tag based on the billing rate code; and
   select a billing rate for a service available to the user in accordance with a billing rate assigned to the billing rate code at a billing unit, wherein the service comprises mobile wireless access to the mobile communication network.

16. The central unit according to claim 15, wherein the central unit is configured to select the billing rate in accordance with an evaluation of the billing rate code at a billing unit of the central unit.

17. The central unit according to claim 15, wherein the central unit is configured to decrypt the billing rate code of the external location tag based on an electronic key.

18. The central unit according to claim 15, wherein the central unit is configured to determine via which base station the mobile terminal is logged into the mobile communication network, and to compare data of the determined base station to the billing rate code of the external location tag.

* * * * *